UNITED STATES PATENT OFFICE.

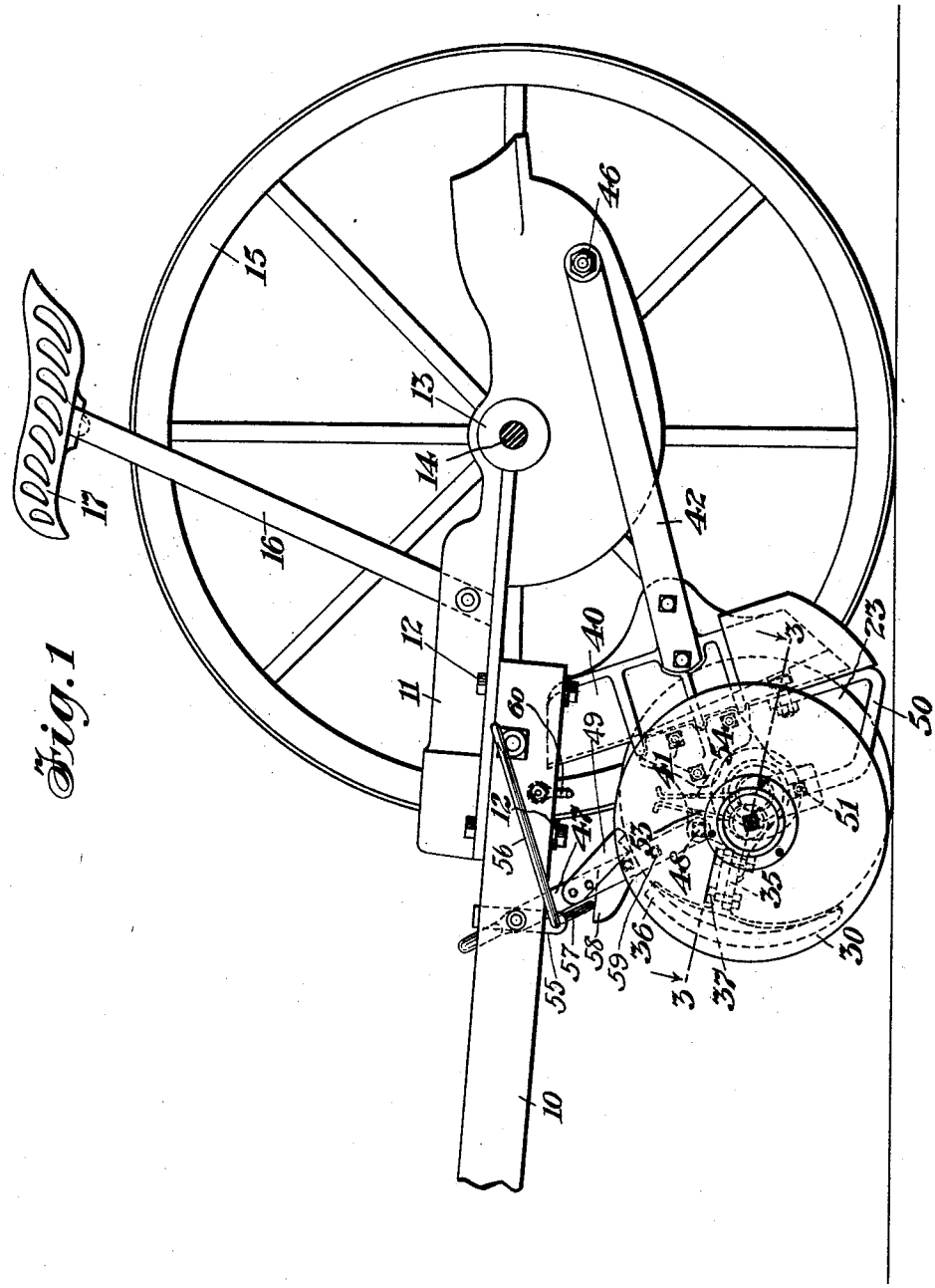

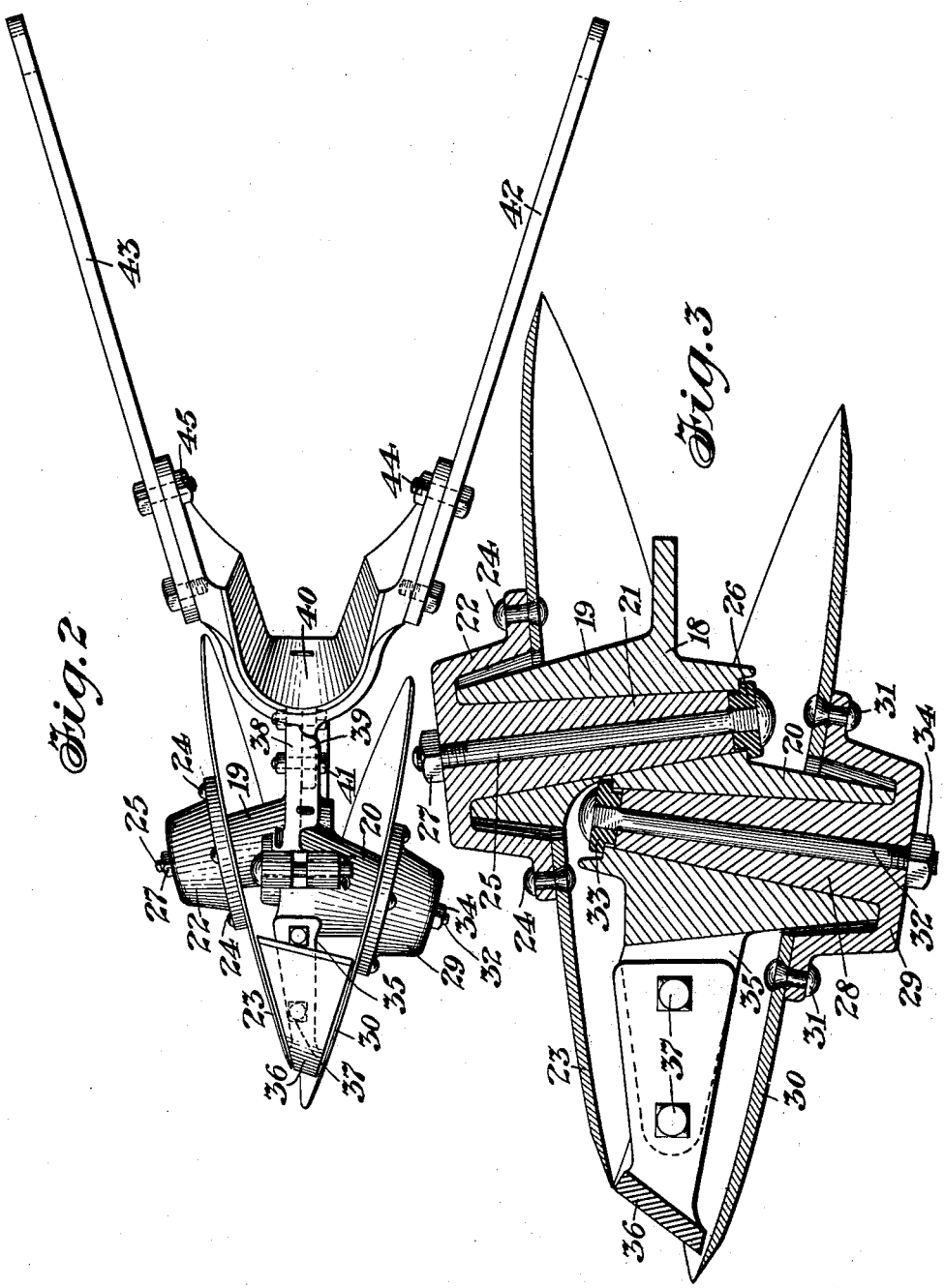

LEWIS AUGUSTUS ASPINWALL, OF JACKSON, MICHIGAN, ASSIGNOR TO ASPINWALL MANUFACTURING COMPANY, OF JACKSON, MICHIGAN, A CORPORATION OF MICHIGAN.

POTATO-PLANTER.

1,104,725.

Specification of Letters Patent.   Patented July 21, 1914.

Application filed August 12, 1913.   Serial No. 784,304.

*To all whom it may concern:*

Be it known that I, LEWIS AUGUSTUS ASPINWALL, a citizen of the United States, residing at Jackson, in the county of Jackson and State of Michigan, have invented an Improvement in Potato-Planters, of which the following is a specification.

My present invention relates to a potato planter, and more particularly to the construction of the devices employed therein to open furrows in the ground, in planting potatoes.

In carrying out my invention, I preferably employ a double disk furrow opener, consisting of a pair of disks so arranged at an angle to each other in a disk frame that one disk is in advance of the other disk and both disks are provided with extremely long bearings.

I am aware that heretofore disk furrow openers have been employed with disks placed one in advance of the other, but the difficulties with this type of furrow opener, with which I am acquainted, are that the disks have not been placed sufficiently far in advance of one to the other, to operate satisfactorily, and the bearings have not been of sufficient extent to long withstand the hard usage to which they are placed.

The principal object of my present invention is therefore to overcome these difficulties, and in so doing I employ a disk frame in which there are overlapping bearings extending substantially the entire distance between the disks and placed at an angle to one another so as to obtain the desired position of the disks, one being placed in advance of the other, and also to get the necessary bearing surface to make an efficient machine.

My invention also includes a nose piece secured in position between the forward edges of the disks and at such an angle as to always clear itself in order to prevent stones and other loose material from working in between the disks, and furthermore I employ a chute, by which the potatoes are conveyed to the furrow, and also a runner member for protecting the chute, as well as means for raising, lowering, securing and maintaining these parts in position, as will be hereinafter more particularly described.

In the drawing, Figure 1 is a sectional elevation of part of the potato planter illustrating the members comprising my present invention. Fig. 2 is a plan view illustrating, on an enlarged scale, the double disk furrow opener, the potato chute, and the support bars made in accordance with my present invention, and Fig. 3 is a cross section taken on the line 3—3, Fig. 1, illustrating the double disk furrow opener on a still larger scale.

Referring to the drawing, 10 indicates a pole by which the potato planter is drawn when in use. Secured to the pole 10 is a main frame 11. These parts may be connected by bolts, indicated at 12, or otherwise. The frame 11 includes a bearing 13, in which an axle 14 is journaled, the wheels 15, upon which the mechanism is supported, being suitably connected to the axle 14. Also secured in the frame 11 is a seat post 16, attached to which, at its upper end, is a seat 17 for the operator of the machine.

The parts hereinbefore described are such as are commonly employed in potato planters and form no part of my present invention.

18 designates a disk frame which is preferably made of cast iron with chilled bearings, and is provided with a bearing 19 and also with a bearing 20. These bearings, as plainly indicated in Fig. 3, are preferably conical and overlap each other to an appreciable extent. Within the bearing 19 is a spindle 21 provided at its outer end with a hub 22, so formed as to be spaced from a portion of the end of the bearing 19 when the hub and spindle are in position.

23 is a disk which is secured to a flange on the hub 22, by means of rivets 24 or otherwise. The spindle 21 is provided with a central longitudinal bore through which a bolt 25 passes, by means of which, together with the washer 26 at the inner end and a nut 27 at the outer end, the spindle with its hub, and the disk are maintained in position in the disk frame. Similarly within the bearing 20, I employ a spindle 28. At its outer end, this is provided with a hub 29 which also extends in a spaced position over a portion of the outer end of the bearing 20. 30 is the second disk similar in all respects to the disk 23, and is secured to the hub 29 or a flange thereof by the rivets 31 or otherwise. The spindle 28 is also provided with a central longitudinal bore, through which a bolt 32 passes, by means of which, together with a washer 33 and a nut 34, the spindle 28, its hub 29, and the disk 30, are maintained in position in the disk frame.

It will be noted that the bearings 19 and 20 are placed at an inclination to one another so that when the spindles are in position in their bearings the disk 30 will be in an appreciably advanced position relatively to the disk 23, and these disks are at the desired inclination to each other. Furthermore, that the bearings which overlap each other extend substantially the entire distance between the disks, and also extend beyond the outer sides of the disks by means of the overhanging hubs provided on the disk spindles, by means of which an exceedingly long bearing is provided so as to withstand the hard usage to which such structures are subjected. It is further to be noted that, at first glance, the hubs 22 and 29 might be considered disadvantageous, but as a matter of fact, it is quite otherwise, as ordinarily the disks extend into the ground, as far as the hubs, and the hubs themselves turn on the surface of the ground in the operation of the machine.

As also indicated in the drawing, I prefer to employ a nose piece 36. This is provided with a lug overlapping the lug 35 provided on the disk frame, and these parts are secured together by bolts 37 or otherwise, and when in position, as also shown in the drawing, this nose piece 36 extends between the forward edges of the disks a distance covering at least their operating surfaces, and is constructed at an angle so as to clear itself of stones and other similar material, preventing the same from working in between the disks. The disk frame is also provided with a projection 38, adapted to receive a projection 39 on a chute 40, and these parts are connected by means of bolts, preferably three in number, and indicated at 41. The chute 40 is similar to like parts hereinbefore employed by me and illustrated in patents which I have obtained, as, for example, Patent No. 709,660, granted September 23, 1902.

42 and 43 represent support bars extending respectively from opposite sides of the chute 40, to which these support bars are connected by bolts 44 and 45 or otherwise. At their opposite ends, these support bars are suitably pivoted in the frame 11, as indicated at 46, so that these parts, together with others associated therewith, may be lowered or raised, depending upon whether the parts are in or out of use.

47 indicates a lifter bar, which at one end is suitably connected by the pivot 48 or otherwise in the disk frame 18.

Suitably connected to the pole piece 10, I employ a hanger 55, and pivotally connected in the lower end of this hanger is a bell crank lever, one arm of which is indicated at 56 and forms a handle for operating or swinging the same, and the other arm 57 of which, at its end, bears against the stop or lug 58 connected to the lifter bar 47, in order, when the parts are in the position illustrated in Fig. 1, to maintain the disks in contact with the ground, the lug 58 being connected to the lifter bar in any one of a number of positions by means of bolts 59, or otherwise, so as to determine the depth to which the disks enter the ground. Furthermore, the lifter bar 48 may be provided with a lug 49, by means of which, in contacting with a stop 60 provided on the frame for this purpose, the disks and associated parts may be supported in their raised positions. When the disks and associated parts are to be raised from their position in use, as shown in Fig. 1, to the position when not in use, the lever arm 56 is swung from right to left in the position shown in this figure, disengaging the lever arm 57 from the lug 58, and the lifter bar 47 may then be swung on its pivotal point from left to right, as shown in this figure, and lifted to raise the disks and associated parts to such a position that the lug 49 may be caused to rest upon the stop 60 to support the disks and associated parts in this raised position.

Together with the hereinbefore parts, I also prefer to employ a runner member, indicated at 50. At one end, this runner member 50 is bolted to the disk frame 18, as indicated at 51, and at its other end is bolted to the potato chute 40, as indicated at 52. This runner member 50 is designed to protect the potato chute, and is similar to the corresponding member indicated in the aforesaid Letters Patent.

As is also indicated in the drawing, I may provide the disk frame 18 with oil tubes or pipes indicated at 53 and 54, leading respectively to the inner or smaller ends of the bearings 19 and 20, and by means of which, as will be understood, a suitable oil or lubricant may be supplied to these bearings, working itself from the smaller inner ends to the outer larger ends thereof.

I claim as my invention:

1. In a potato planter, a double disk furrow opener, comprising a disk frame having overlapping juxtaposed bearings set at an inclination to each other, disks, spindles to which the said disks are secured and which fit and turn within the said bearings, which extend substantially from disk to disk, and means for securing each spindle in position within its bearing.

2. In a potato planter, a double disk furrow opener comprising a disk frame having overlapping juxtaposed bearings set at an inclination to each other, disks with spindles adapted to fit and turn within the said bearings, which extend substantially from disk to disk, hubs at the free ends of the said spindles, to which the said disks are connected, and means for securing each spindle in position within its bearing.

3. In a potato planter, a double disk furrow opener comprising a disk frame having overlapping juxtaposed bearings set at an inclination to each other, disks with spindles adapted to fit and turn within the said bearings, which extend substantially from disk to disk, hubs at the free ends of the said spindles to which the said disks are connected, a bolt extending longitudinally through each spindle, and a washer and nut associated with each bolt coacting therewith to maintain the spindle in position in its bearing.

4. In a potato planter, a double disk furrow opener comprising a disk frame having overlapping bearings set at an inclination to each other, disks located, one in advance of the other, spindles to which said disk furrow openers are secured and which fit and turn within the said bearings, an inclined nose piece fixed in position between the advanced edges of the said disks, and means for securing the said spindles and disks in position within the said bearings.

5. In a potato planter, a double disk furrow opener comprising a disk frame having overlapping bearings set at an inclination to each other, spindles revoluble within the said bearings, a hub at the free end of each spindle, a disk secured to each hub, means for maintaining the said spindles, hubs and disks in position within their bearings, and a nose piece fixed in position between the forward edges of the said disks.

6. In a potato planter and in combination, a main frame, a disk frame having overlapping juxtaposed bearings set at an inclination therein, spindles, disks secured to the spindles, means for securing the spindles and disks in position in the said bearings, and means for lowering and raising the said parts and maintaining the same in both the lowered and raised positions.

7. In a potato planter and in combination, a main frame, a disk frame having overlapping juxtaposed bearings set at an inclination therein, spindles, disks secured to the spindles, means for securing the spindles and disks in position in the said bearings, means for pivotally connecting the said parts to the said main frame, and means for lowering and raising the said parts and maintaining the same in both the lowered and raised positions.

8. In a potato planter and in combination, a main frame, a disk frame having overlapping bearings set at an inclination therein, spindles, disks secured to the spindles, a nose piece fixed in the disk frame and located between the advanced edges of the said disk furrow openers, means for securing the spindles and disks in position in the said bearings, means for pivotally connecting the said parts to the said main frame, and means for lowering and raising the said parts and maintaining the same in both the lowered and raised positions.

9. In a potato planter and in combination, a main frame, a disk frame having overlapping bearings set at an inclination to each other, spindles adapted to revolve within the said bearings, disk furrow openers secured to the said spindles, means for maintaining the said spindles and disks in position in the said bearings, a chute connected to said disk frame, supporting bars connected at the corresponding ends to the said chute and pivotally connected at their opposite ends in the said main frame, and means for lowering and raising the said parts and maintaining the same in their operative or inoperative positions.

10. In a potato planter and in combination, a main frame, a disk frame having overlapping bearings set at an inclination to each other, spindles adapted to revolve within the said bearings, disks secured to the said spindles, means for maintaining the said spindles and disks in position in the said bearings, a chute connected to said disk frame, supporting bars connected at the corresponding ends to the said chute and pivotally connected at their opposite ends in the said main frame, a runner member connected at one end to the said disk frame and at the opposite end to the said chute, and means for lowering and raising the said parts and maintaining the same in their operative or inoperative positions.

Signed by me this 5th day of August, 1913.

LEWIS AUGUSTUS ASPINWALL.

Witnesses:
GEO. N. WHITNEY,
C. G. ROWLEY.